(12) United States Patent
Miyauchi et al.

(10) Patent No.: US 6,253,030 B1
(45) Date of Patent: Jun. 26, 2001

(54) CAMERA SHUTTER

(75) Inventors: Osamu Miyauchi; Kunioki Takahashi, both of Narashino (JP)

(73) Assignee: Seiko Precision Inc. (JP)

( * ) Notice: Subject to any disclaimer, the term of this patent is extended or adjusted under 35 U.S.C. 154(b) by 0 days.

(21) Appl. No.: 09/286,051

(22) Filed: Apr. 5, 1999

(30) Foreign Application Priority Data

Apr. 3, 1998 (JP) .................................................. 10/091340

(51) Int. Cl.$^7$ ................................. G03B 9/70; G03B 1/00
(52) U.S. Cl. ............................ 396/195; 396/403; 396/463
(58) Field of Search ..................................... 396/435, 436, 396/437, 439, 460, 463, 183, 195, 403, 500, 501, 467, 469, 194, 471, 466

(56) References Cited

U.S. PATENT DOCUMENTS 4,334,747 * 6/1982 Shimada et al. ...................... 396/195
5,181,063 * 1/1993 Tagami et al. ....................... 396/235

* cited by examiner

*Primary Examiner*—W. B. Perkey
(74) *Attorney, Agent, or Firm*—Adams & Wilks

(57) ABSTRACT

A shutter for a camera has a film advance mechanism for advancing film past a shutter opening and a stroboscope for emitting light. The shutter has a base plate having the shutter opening, opening sectors for undergoing opening movement in an operational state to open the shutter opening during a shutter release operation, and closing sectors for undergoing closing movement in an operational state to close the shutter opening during the shutter release operation. A first detecting device detects the operational state of the opening sectors and outputs a signal to the stroboscope to emit light. A second detecting device detects the operational state of the closing sectors and outputs a signal for winding up the film. A non-opened state of the shutter opening is detected after the shutter release operation when the second detecting device detects the operational state of the closing sectors before the first detecting device detects the operational state of the opening sectors.

8 Claims, 5 Drawing Sheets

CAMERA SHUTTER

BACKGROUND OF THE INVENTION

1. Field of the Invention

The present invention relates generally to a camera shutter construction and, more particularly, to a camera shutter for carrying out an exposure operation by controlling the opening and closing of shutter sectors.

2. Background Information

In a conventional camera shutter, opening and closing operations of an opening lever and a closing lever for opening and closing sectors of the shutter, respectively, are controlled, inter alia, by electromagnets for carrying out an exposure operation. The opening and closing operations of the opening and closing levers are controlled by changing the timing for turning OFF a current supplied to the electromagnets to thereby carry out the exposure operation. Furthermore, contact pieces for outputting a trigger signal of a stroboscope for emitting light are installed at a position in the vicinity of the opening lever, so that when the opening operation of the opening lever is completed, the contact pieces output the trigger signal and the stroboscope emits light. Likewise, contact pieces for outputting a signal for winding-up film are installed at a position in the vicinity of the closing lever, so that when the closing operation of the closing lever is completed, the contact pieces output the signal to wind-up the film.

In a conventional method of determining whether the operation for opening the shutter sectors has been carried out in the foregoing conventional camera shutter construction, a non-opening state of the shutter sectors is detected when the signal for winding-up the film has been outputted before the current supplied to the electromagnet associated with the opening lever is turned OFF after the shutter is released.

However, in the foregoing conventional shutter structure and operation, even when current supplied to the electromagnet associated with the opening lever is turned OFF, a determination of whether the operation for opening the shutter sectors has been carried out cannot be effectively made and, therefore, a non-opening state of the shutter sectors cannot be effectively detected.

The present invention overcomes many of the disadvantages inherent in conventional camera shutters by providing a camera shutter which is capable of effectively detecting a non-opening state of shutter sectors.

SUMMARY OF THE INVENTION

It is an object of the invention to provide a camera shutter which can effectively detect a non-opening state of shutter sectors.

Another object of the present invention is to provide a camera shutter which can detect a non-opening state of shutter sectors by detecting a state in which closing sectors have completed a shutter closing operation before opening sectors have completed a shutter opening operation. The shutter opening and closing operations are detected by means of a trigger signal of a stroboscope for emitting light and a signal for winding up a film, respectively.

Another object of the present invention is to provide a camera shutter which is simple in construction and can be manufactured at low cost.

The foregoing and other objects of the present invention are carried out by a camera shutter comprising a base plate having a shutter opening, a plurality of opening sectors for undergoing opening movement in an operational state to open the shutter opening during a shutter release operation, and a plurality of closing sectors for undergoing closing movement in an operational state to close the shutter opening during the shutter release operation. A first detecting device detects the operational state of the opening sectors. A second detecting device detects the operational state of the closing sectors. A non-opened state of the shutter opening is detected after the shutter release operation when it is determined that the second detecting device detects the operational state of the closing sectors before the first detecting device detects the operational state of the opening sectors.

In another embodiment, a camera shutter according to the present invention comprises a base plate having a shutter opening, a plurality of opening sectors for undergoing opening movement in an operational state to open the shutter opening during a shutter release operation, and a plurality of closing sectors for undergoing closing movement in an operational state to close the shutter opening during the shutter release operation. A first detecting device detects the operational state of the opening sectors. A second detecting device detects the operational state of the closing sectors. A timer measures a preselected time interval from a point at which the first detecting device detects the operational state of the opening sectors. A non-opened state of the shutter opening is detected after the shutter release operation when it is determined that a time period from the point at which the first detecting device detects the operational state of the opening sectors to a point at which the second detecting device detects the operational state of the closing sectors is shorter than the preselected time interval.

In another embodiment, a camera shutter according to the present invention comprises a base plate having a shutter opening, a plurality of opening sectors for undergoing opening movement in an operational state to open the shutter opening during a shutter release operation, and a plurality of closing sectors for undergoing closing movement in an operational state to close the shutter opening during the shutter release operation. A first detecting device detects the operational state of the opening sector. A second detecting device detects the operational state of the closing sectors. An abnormal state of the camera shutter is detected when it is determined that the first detecting device detects the operational state of the opening sectors before the shutter release operation.

BRIEF DESCRIPTION OF THE DRAWINGS

The foregoing summary, as well as the following detailed description of the preferred embodiments of the invention, will be better understood when read in conjunction with the accompanying drawings. For the purpose of illustrating the invention, there is shown in the drawings an embodiment which is presently preferred. It should be understood, however, that the invention is not limited to the precise arrangement and instrumentalities shown. In the drawings.

DETAILED DESCRIPTION OF THE PREFERRED EMBODIMENTS

While this invention is susceptible of embodiments in many different forms, this specification and the accompanying drawings disclose only preferred embodiments of the invention. The invention is not intended to be limited to the embodiments so described, and the scope of the invention will be pointed out in the appended claims.

Embodiments in accordance with the present invention will be described below with reference to the accompanying drawings.

Figure 1:
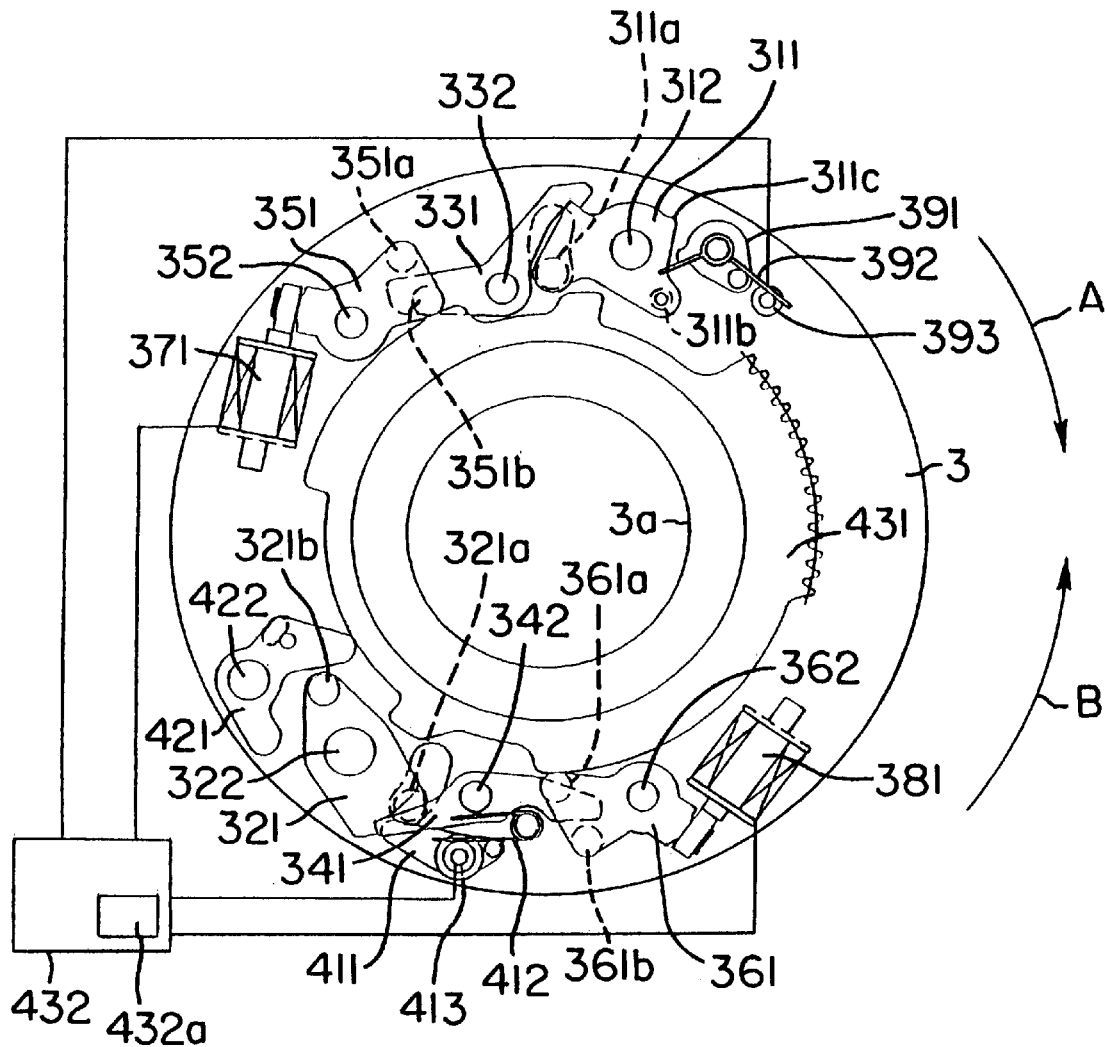
FIG. 1 is a plane view of a lens shutter showing a constitution of a first embodiment of the invention.

An explanation will be given of embodiments of the invention in reference to the drawings as follows. FIG. 1 is a plane view of a lens shutter representing a first embodiment according to the present invention. A shutter opening 3a is disposed at a central portion of a shutter base plate 3. A set ring 431 is mounted on the shutter base plate 3 for pivotal movement about a circle concentric with the shutter opening 3a. An opening lever 311 for driving opening sectors 511 and 512 (FIG. 2) is pivotably supported by a shaft 312 integral with the shutter base plate 3 proximate a peripheral portion of the set ring 431. The opening lever 311 can be returned to an initial position when a pin 311b thereof is pushed by pivoting the set ring 431. An opening lock lever 331 for holding the opening lever 311 at an opened position is pivotably supported by a shaft 332 integral with the shutter base plate 3. An opening iron piece lever 351 for driving the opening lock lever 331 is pivotably supported by a shaft 352 integral with the shutter base plate 3. The opening iron piece lever 351 can be attracted and held by an opening electromagnet 371, and can be returned to an initial position when a pin 351a is pushed by pivoting the set ring 431. The opening lever 311, the opening lock lever 331 and the opening iron piece lever 351 are urged in a clockwise direction A by springs (not shown).

An opening switch lever 391 is also pivotably supported by the base plate 3 and is urged in the clockwise direction A by an opening switch spring 392. The opening switch spring 392 can be brought into conductive contact with an opening switch arbor 393 by pivoting the opening switch lever 391 in the clockwise direction A to thereby turn the opening switch arbor 393 OFF. The opening switch arbor 393 is turned ON when the opening switch spring 392 is separated from the opening switch arbor 393 by pivoting the opening switch lever 391 in a counterclockwise direction B by driving the opening lever 311.

The opening electromagnet 371 is positioned on the shutter base plate 3 by a boss or the like (not shown). A control device 432 detects an OFF state of the opening switch arbor 393 and controls the opening electromagnet 371. The control device 432 comprises a CPU, a microprocessor or the like (hereinafter referred to as CPU).

A closing lever 321 for driving closing sectors 521 and 522 is pivotably supported by a shaft 322 integral with the shutter base plate 3 and is urged in the counterclockwise direction B by a spring (not shown). A closing lock lever 341 for holding the closing lever 321 at an opening position is pivotably supported by a shaft 342 integral with the shutter base plate 3. A closing iron piece lever 361 for driving the closing lock lever 341 is pivotably supported by a shaft 362 integral with the shutter base plate 3. The closing iron piece lever 361 and can be attracted and held by a closing electromagnet 381 and can be returned to an initial position by pushing a pin 361a of the closing iron piece lever 361 by pivoting the set ring 431.

A charge lever 421 for returning the closing lever 321 to an initial position is pivotally supported by a shaft 422 integral with the shutter base plate 3 proximate a peripheral portion of the set ring 431. The charge lever 421 is pivoted in the counterclockwise direction B by pivoting the set ring 431 and returns the closing lever 321 to an initial position by pushing a pin 321b of the closing lever 321. The charge lever 421, the closing lock lever 341 and the closing iron piece lever 361 are urged in the clockwise direction A by springs (not shown).

A closing switch lever 411 is disposed at a vicinity of the closing lock lever 341 and is urged in the clockwise direction A by a closing switch spring 412. The closing switch spring 412 can be brought into conductive contact with a closing switch arbor 413 when the closing lever 321 is driven in the counterclockwise direction B to thereby turn the closing switch arbor 413 ON. The closing electromagnet 381 is positioned on the shutter base plate 3 by a boss or the like (not shown). The closing switch arbor 413 and the closing electromagnet 381 are connected to the CPU 432 which controls the closing electromagnet 381 and detects an ON state of the closing switch arbor 413.

Figure 2:
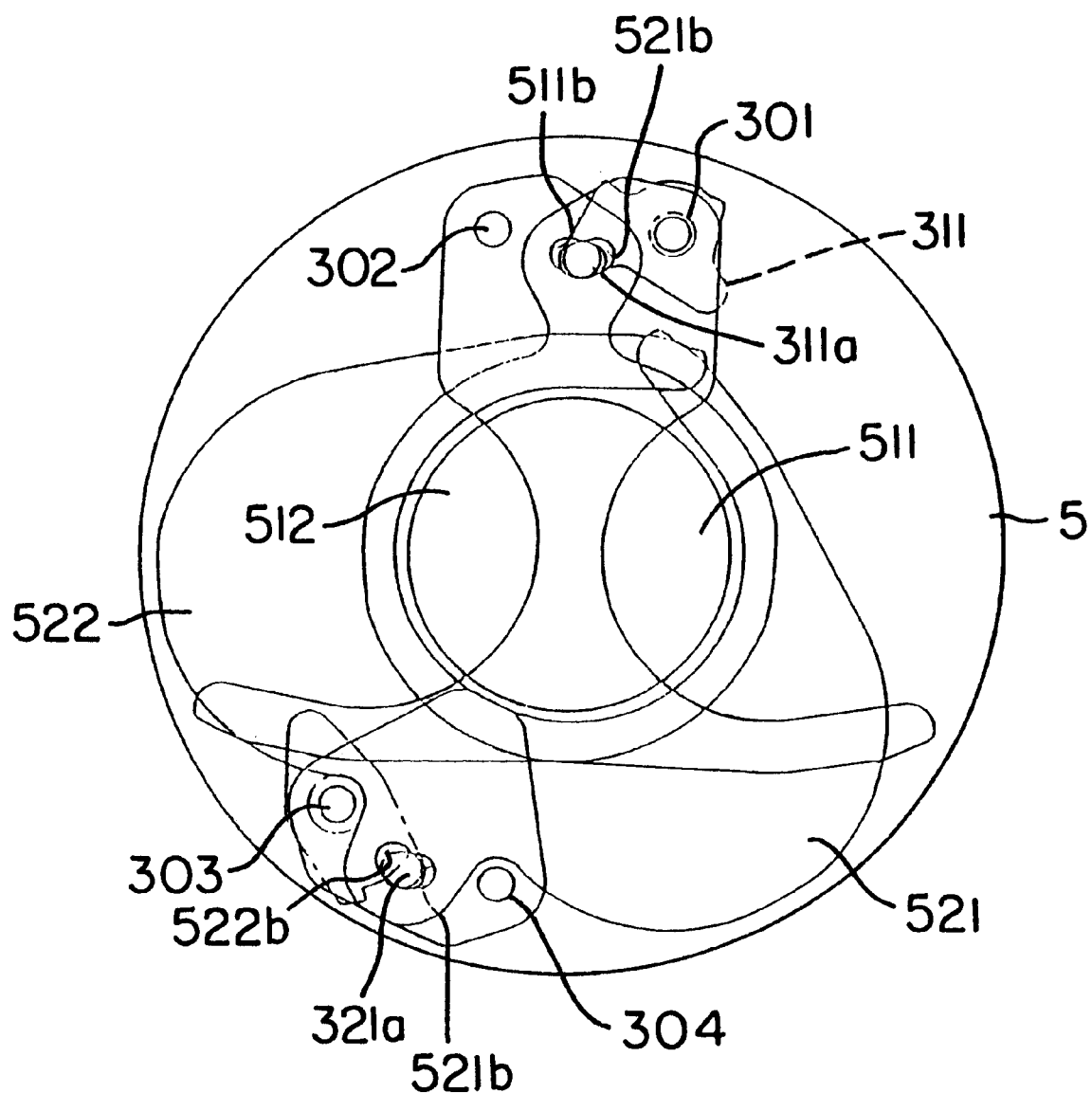
FIG. 2 is a plane view of a sector unit of the lens shutter showing the constitution of the first embodiment of the invention.

Referring now to FIG. 2, the opening sectors 511 and 512 are pivotably supported by shafts 301 and 302 below the shutter base plate and between the shutter base plate 3 and a sector holding plate 5. The opening sectors 511 and 512 have long hole portions 511b and 512b, respectively, fitted to a projection 311a of the opening lever 311. Furthermore, similar to the opening sectors 511 and 512, the closing sectors 521 and 522 are pivotably supported by shafts 303 and 304, respectively, below the shutter base plate 3 and between the shutter base plate 3 and the sector holding plate 5. The closing sectors 521 and 522 have long hole portions 521b and 522b, respectively, fitted to a projection 321a of the closing lever 321.

FIG. 1 shows a state in which the shutter has been charged in readiness for a shutter release operation. More specifically, the respective levers are positioned in a charged state by first pivoting the set ring 431 in the clockwise direction A, and the levers remain in a predetermined standby state by subsequently pivoting the set ring 431 in the counterclockwise direction B. At this point, the opening operation of the opening lever 311 is hampered by the opening lock lever 331, and the opening iron piece lever 351 is attracted and held by the opening electromagnet 371. The closing lever 321 also remains in a similar state. Also at this point, the opening switch spring 392 is brought into conductive contact with the opening switch arbor 393, and the opening sectors 511 and 512 are in a closed state. Likewise, the closing switch spring 412 is separated from the closing switch arbor 413 by the projection 411a of the closing switch lever 411, and the closing sectors are in an opened state.

Figure 3:
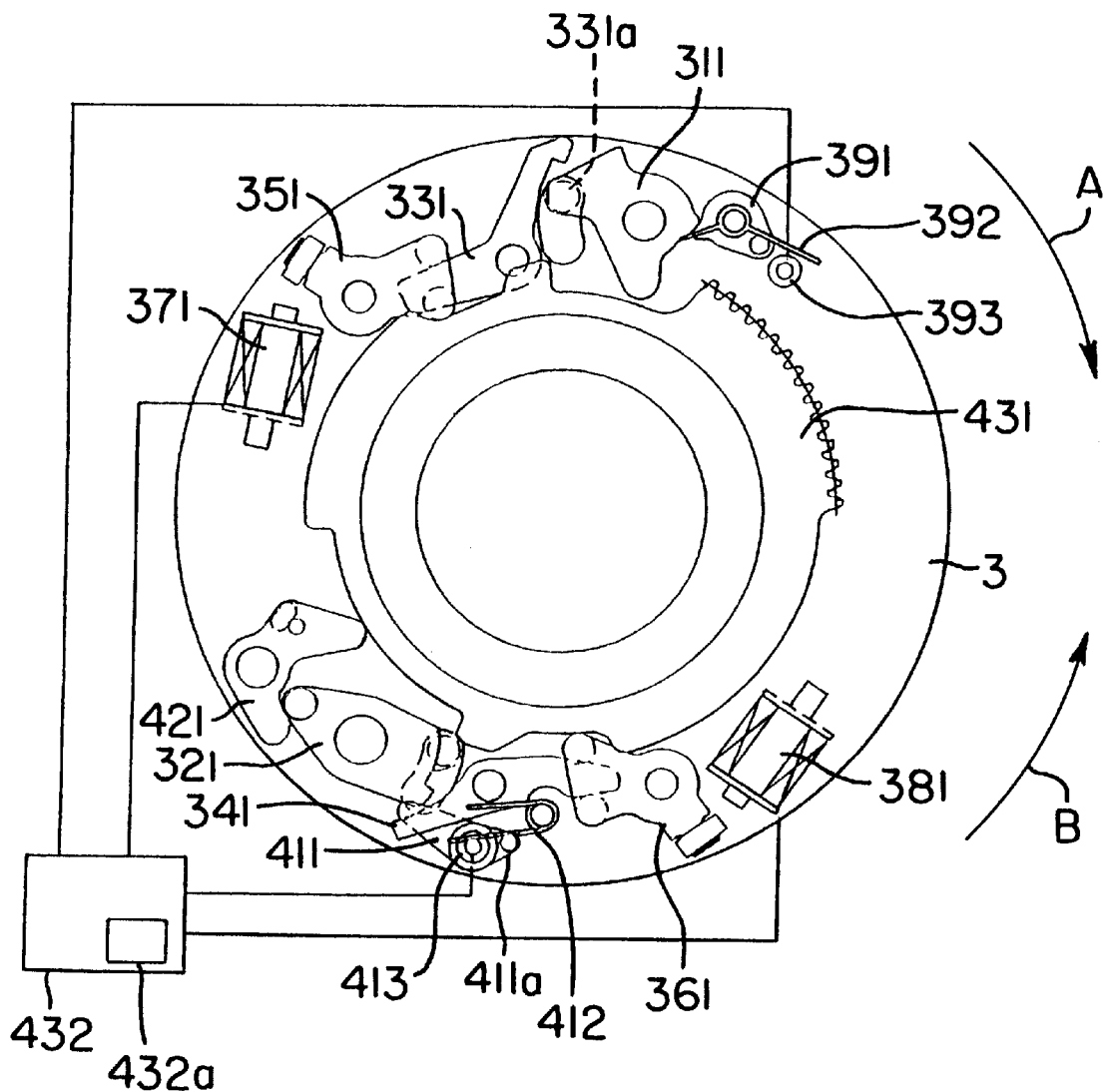
FIG. 3 is a plane view of the lens shutter showing a state after exposure operation of the first embodiment of the invention.
Figure 4:
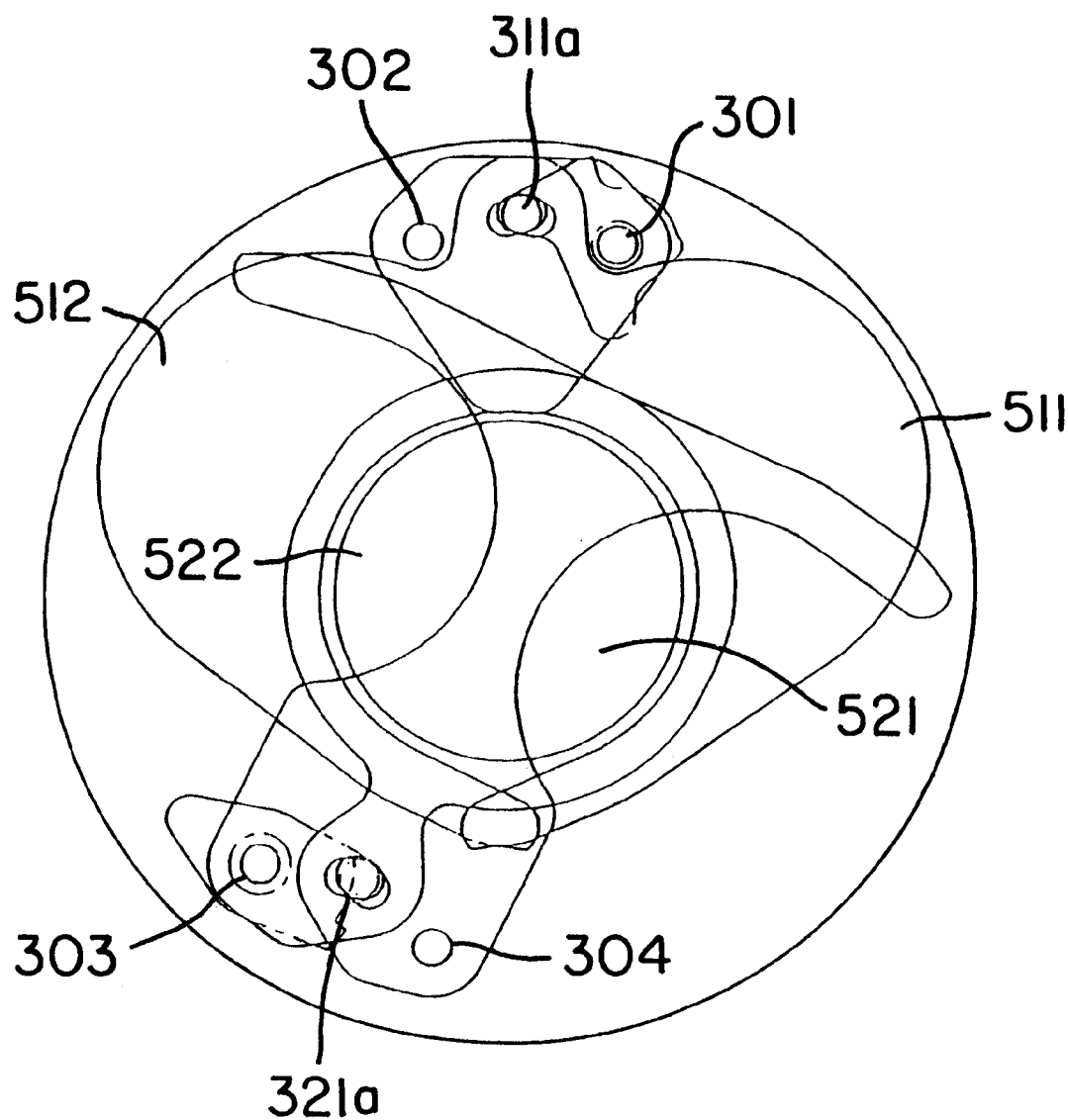
FIG. 4 is a plane view of the sector unit of the lens shutter showing the state after exposure operation of the first embodiment of the invention.

When a shutter release operation is carried out from the state shown in FIG. 1, the set ring 431 is pivoted in the counterclockwise direction B and stops at a predetermined position (FIG. 3). Thereafter, the current supplied to the opening electromagnet 371 is turned OFF, and the opening iron piece lever 351 is rotated or turned in the clockwise direction A by the urging force of the springs and pivots the opening lock lever 331 in the counterclockwise direction B. As a result, the opening lever 311 is rotated in the clockwise direction A by urging force of the springs and opens the opening sectors 511 and 512. When the shutter release operation approaches completion, the projection 311b of the opening lever 311 pushes the opening switch lever 391 and rotates the opening switch lever 391 in the counterclockwise direction B. Consequently, the opening switch spring 392 is separated from the opening switch arbor 393 to thereby place the opening switch arbor 393 in an OFF state. At this point, the OFF state of the opening switch arbor 393 is detected by the CPU 432 which outputs an OFF signal which is used as a trigger signal for light emission by a stroboscope (not shown). Furthermore, the OFF signal is used as a signal for detecting the termination of a driving operation of the opening sectors 511 and 512.

When the CPU 432 turns OFF the current supplied to the closing electromagnet 381 after elapse of a desired exposure time period, the closing iron piece lever 361 is pivoted in the clockwise direction A, the locking state is released by pushing the closing lock lever 341 by a pin 361b of the closing iron piece lever 361, and the closing lever 321 is pivoted in the counterclockwise direction B to thereby close the closing sectors 521 and 522. When the shutter release operation approaches completion, the closing switch spring 412 is brought into conductive contact with the closing switch arbor 413 to place the closing switch arbor 413 in an ON state. At this point, the ON state of the opening switch arbor 413 is detected by the CPU 432 which outputs an ON signal which is used as a signal for winding up a film. Furthermore, the ON signal is also used as a signal for detecting the termination of a driving operation of the closing sectors.

By the foregoing construction and operation of the camera shutter according to the present invention, in the case in which after the shutter release operation the closing switch spring 412 is brought into conductive contact with the closing switch arbor 413 before the opening switch spring 392 is separated from the opening switch arbor 393, the CPU 432 detects the signals from the corresponding ON/OFF state of the closing switch arbor 413 and the opening switch arbor spring 392 and outputs a signal indicating that the opening lever 311 or the closing lever 321 is not operated normally. Stated otherwise, the CPU 432 can detect that the closing sectors 521 and 522 are operated before the opening sectors 511 and 512 operate, thereby detecting a non-opened state of the opening sectors 511 and 512. The non-opened state of the opening sectors 511 and 512 can be effectively detected even when the opening electromagnet 371 and the closing electromagnet 381 are normally controlled by the CPU 432.

The camera shutter of the present invention further comprises timer means 432a for calculating a time period from the point when the opening switch spring 392 has been separated from the opening switch 393 and the corresponding OFF signal has been outputted to the point when the closing switch spring 412 is brought into conductive contact with the closing switch arbor 413. By this construction, even in the case in which the opening electromagnet 371 and the closing electromagnet 381 are normally controlled by CPU 432, when the closing switch spring 412 is brought into conductive contact with the closing switch arbor 413 in a time period shorter than a desired time period (e.g., 0.5 ms) from when the opening switch spring 392 has been separated from the opening switch arbor 393 and the OFF signal has been outputted, a signal is outputted indicating that the closing lever 321 is not operated normally. Stated otherwise, the CPU 432 can detect that the closing sectors 521 and 522 are operated before the opening sectors 511 and 512 operate, thereby detecting a non-opened state of the opening sectors 511 and 512.

Moreover, an abnormality in the operation of the camera shutter of the present invention can be detected even when the opening electromagnet 371 is not turned OFF. For example, the unintentional opening of the opening sectors 511 and 512 can be detected when the CPU 432 detects the OFF signal corresponding to the opening switch spring 392 being separated from the opening switch arbor 393 before the shutter release operation.

Figure 5:
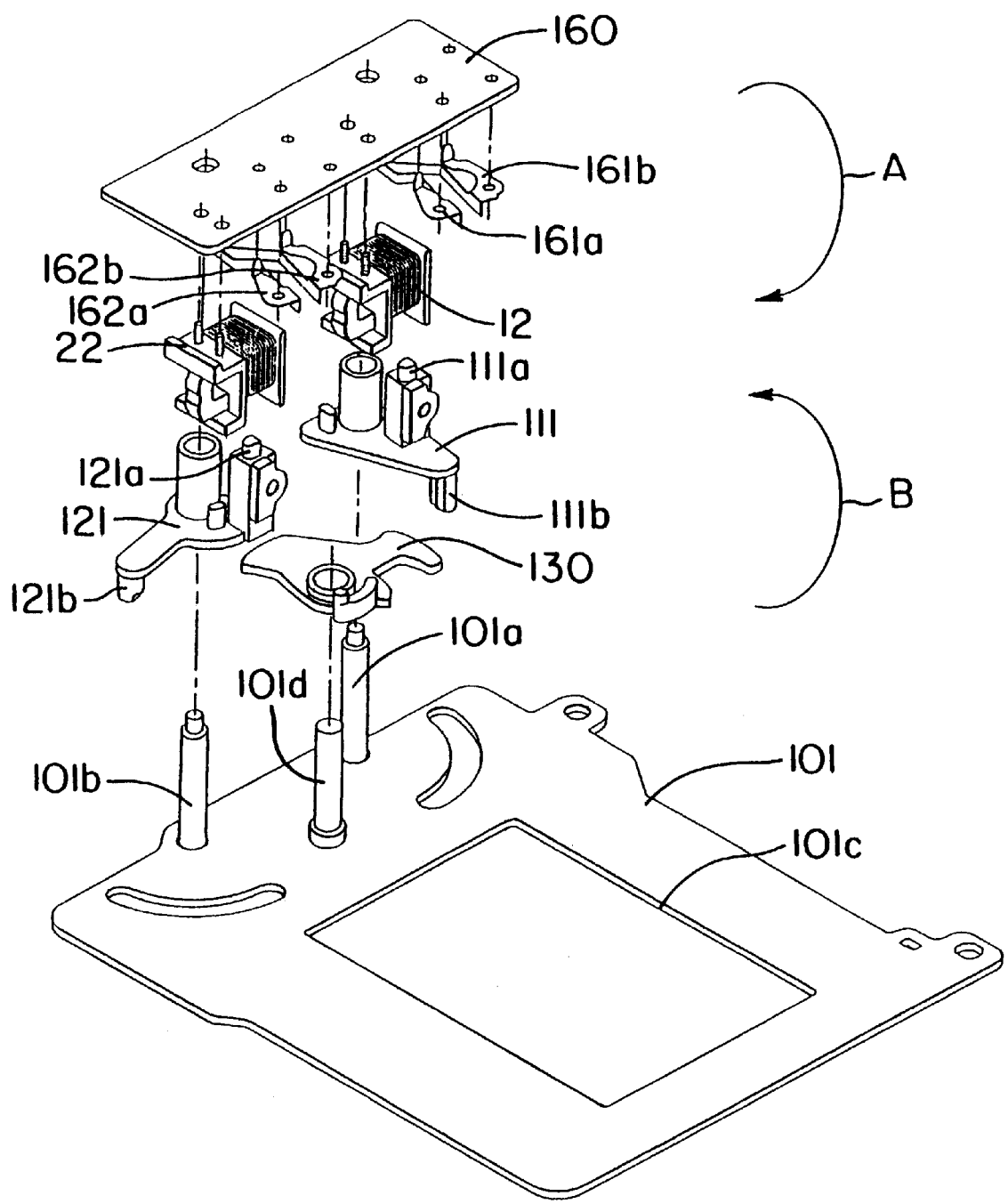
FIG. 5 is a perspective view of essential portions of a focal plane shutter showing the constitution of a second embodiment of the invention.

FIG. 5 is a perspective view of essential portions of a focal plane shutter according to a second embodiment of the invention.

A shutter opening 101C is disposed in a shutter base plate 101. An opening lever 111 is pivotably supported by a shaft 101a integral with the shutter base plate 101 and is urged in the counterclockwise direction B by an opening spring (not shown). Similarly, a closing lever 121 is pivotably supported by a shaft 101b integral with the shutter base plate 101 and is urged in the counterclockwise direction B by a closing spring (not shown). An opening sector unit and a closing sector unit (not shown) are fitted to projections 111b and 121b of respective front ends of the opening lever 111 and the closing lever 121.

A charge lever 130 is pivotably supported by a shaft 101d integral with the shutter base plate 101. The opening lever 111 and the closing lever 121 are displaced to charge positions by the charge lever 130. Movements of the opening lever 111 and the closing lever 121 are controlled by an opening electromagnet 12 and a closing electromagnet 22 which are controlled by a CPU (not shown). A printed circuit board 160 is supported by upper ends of the shafts 101a and 101b, and the opening electromagnet 12 and the closing electromagnet 22 are electrically connected to the printed circuit board 160 by soldering. Opening contact pieces 161a and 161b and closing contact pieces 162a and 162b are calked to the printed circuit board 160.

A boss 111a is connected to the opening lever 111 for pushing the contact piece 161a to a location proximate the termination of travel of the opening lever 111 to thereby bring the opening contact pieces 161a and 161b into electrical contact with each other. At this point, a signal representative of the contact between the opening contact pieces 161a and 161b is used both as a trigger signal for light emission by a stroboscope (not shown) and as a signal for detecting termination of a driving operation of the opening sector unit. Likewise, a boss 121a is connected to the closing lever 121 for pushing the contact piece 162a to a location proximate the termination of travel of the closing lever 121 to thereby bring the closing contact pieces 162a and 162b into contact with each other. At this point, a signal representative of the contact between the closing contact pieces 162a and 162b is used both as a trigger signal for winding up a film and as a signal for detecting termination of a driving operation of the closing sector unit.

During use of a camera having the focal plane shutter according to the present invention, when a photographer initiates a shutter release operation by pressing a shutter release button (not shown), the charge lever 130 is first released, and the CPU turns OFF the current supplied to the opening electromagnet 12. As a result, the opening lever 111 is pivoted in the counterclockwise direction B by an opening spring (not shown) and opens the shutter opening 101c. Thereafter, the boss 111a of the opening lever 111 approaches the opening contact piece 161a and is finally brought into contact therewith to thereby bring the opening contact pieces 161a and 161b into electrical contact with each other. At this point, a signal representative of the contact between the opening contact pieces 161a and 161b is used both as a trigger signal for light emission of the stroboscope and as a signal for detecting termination of the driving operation of the opening sector unit.

When the CPU turns OFF the current supplied to the closing electromagnet 22 after elapse of desired exposure time period, the closing lever 121 is pivoted in the counter-clockwise direction B to thereby close the shutter opening 101c. In the closing stroke of the closing lever 121, the boss 121a approaches the closing contact piece 162a and is finally brought into contact therewith to thereby bring the closing contact pieces 162a and 162b into electrical contact with each other. At this point, a signal representative of the contact between the closing contact pieces 162a and 162b is used both as a trigger signal for winding up a film and as a signal for detecting termination of the driving operation of the closing sector unit.

By the foregoing construction and operation of the focal plane shutter according to the present invention, the CPU effectively detects the case in which, after the shutter release operation, the closing contact pieces 162a and 162b are brought into electrical contact with each other before the opening contact pieces 161a and 161b are brought into electrical contact with each other and outputs a signal indicating the closing lever 121 is not operated in a normal state. Thus the CPU detects that the closing sector unit is operated before the opening sector unit is operated, thereby detecting a non-opened state of the opening sector unit.

According to the camera shutter of the present invention, a trigger signal for light emission of a stroboscope is used as a signal for detecting termination of a driving operation of opening sectors of the camera shutter. Accordingly, even when the opening sectors are not operated properly while the opening electromagnet is turned OFF, the non-opened state of the opening sectors can be effectively detected.

Furthermore, an abnormality in the operation of the camera shutter of the present invention can be detected even when the opening electromagnet is not turned OFF. For example, the unintentional opening of the opening sectors can be detected when the CPU detects the OFF signal corresponding to the opening switch spring being separated from the opening switch arbor before the shutter release operation.

Moreover, by incorporating timer means in the camera shutter according to the present invention, the non-opened state of the opening sectors can be detected even when the closing sectors operate abnormally while the opening sectors operate without any abnormality.

From the foregoing description, it can be seen that the present invention comprises an improved camera shutter. It will be appreciated by those skilled in the art that obvious changes can be made to the embodiments described in the foregoing description without departing from the broad inventive concept thereof. It is understood, therefore, that this invention is not limited to the particular embodiments disclosed, but is intended to cover all obvious modifications thereof which are within the scope and the spirit of the invention as defined by the appended claims.

What is claimed is:

1. A shutter for a camera having a film advance mechanism for advancing film past a shutter opening and a stroboscope for emitting light, the shutter comprising: a base plate having the shutter opening; a plurality of opening sectors for undergoing opening movement in an operational state to open the shutter opening during a shutter release operation; a plurality of closing sectors for undergoing closing movement in an operational state to close the shutter opening during the shutter release operation; first detecting means for detecting the operational state of the opening sectors and outputting a signal to the stroboscope to emit light; second detecting means for detecting the operational state of the closing sectors and outputting a signal for winding up the film; and means for detecting a non-opened state of the shutter opening after the shutter release operation when the second detecting means detects the operational state of the closing sectors before the first detecting means detects the operational state of the opening sectors.

2. A camera shutter according to claim 1; wherein the camera shutter comprises a focal plane shutter.

3. A shutter for a camera having a film advance mechanism for advancing film past a shutter opening and a stroboscope for emitting light, the shutter comprising: a base plate having the shutter opening; a plurality of opening sectors for undergoing opening movement in an operational state to open the shutter opening during a shutter release operation; a plurality of closing sectors for undergoing closing movement in an operational state to close the shutter opening during the shutter release operation; first detecting means for detecting the operational state of the opening sectors and outputting a signal to the stroboscope to emit light; second detecting means for detecting the operational state of the closing sectors and outputting a signal for winding up the film; timer means for measuring a preselected time interval from a point at which the first detecting means detects the operational state of the opening sectors; and means for detecting a non-opened state of the shutter opening after the shutter release operation when a time period from the point at which the first detecting means detects the operational state of the opening sectors to a point at which the second detecting means detects the operational state of the closing sectors is shorter than the preselected time interval.

4. A camera shutter according to claim 3; wherein the camera shutter comprises a focal plane shutter.

5. A shutter for a camera having a film advance mechanism for advancing film past a shutter opening and a stroboscope for emitting light, the shutter comprising: a base plate having the shutter opening; a plurality of opening sectors for undergoing opening movement in an operational state to open the shutter opening during a shutter release operation; a plurality of closing sectors for undergoing closing movement in an operational state to close the shutter opening during the shutter release operation; first detecting means for detecting the operational state of the opening sectors and outputting a signal to the stroboscope to emit light; second detecting means for detecting the operational state of the closing sectors and outputting a signal for winding up the film; and means for detecting an abnormal state of the camera shutter when the first detecting means detects the operational state of the opening sectors before the shutter release operation.

6. A camera shutter according to claim 5; wherein the camera shutter comprises a focal plane shutter.

7. A shutter for a camera having a film advance mechanism for advancing film past a shutter opening and a stroboscope for emitting light, the shutter comprising: a base plate having a shutter opening; a plurality of opening sectors for undergoing opening movement in an operational state to open the shutter opening during a shutter release operation; a plurality of closing sectors for undergoing closing movement in an operational state to close the shutter opening during the shutter release operation; shutter release operation means for starting the shutter release operation; first detecting means for detecting the operational state of the opening sectors and outputting a signal to the stroboscope to emit light; second detecting means for detecting the operational state of the closing sectors and outputting a signal for winding up the film; and means for detecting a non-opened state of the shutter opening after the shutter release operation when the second detecting means detects the operational state of the closing sectors before the first detecting means detects the operational state of the opening sectors.

8. A shutter for a camera having a film advance mechanism for advancing film past a shutter opening and a stroboscope for emitting light, the shutter comprising: shutter sectors for opening and closing the shutter opening during a shutter release operation; shutter release operation means for starting the shutter release operation; first detecting means for detecting an opening state of the opening sectors and outputting a signal to the stroboscope to emit light; second detecting means for detecting a closing state of the closing sectors and outputting a signal for winding up the film; and means for detecting a non-opened state of the shutter opening after the shutter release operation when the second detecting means detects the closing state of the closing sectors before the first detecting means detects the opening state of the opening sectors.

* * * * *